Aug. 20, 1957     A. C. BORGMAN ET AL     2,803,503
PLATFORM BRACKETS FOR SECTIONAL SCAFFOLDS
Filed Aug. 2, 1956     7 Sheets-Sheet 5
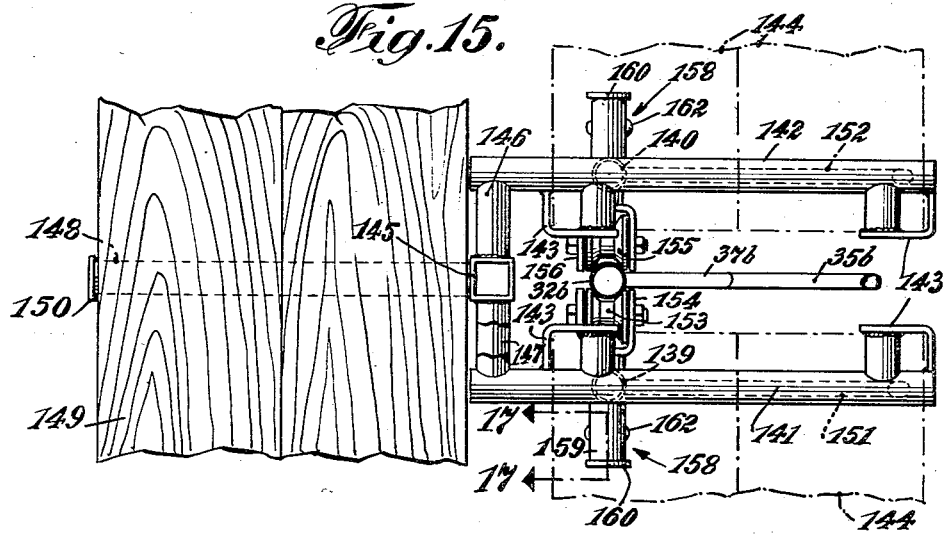
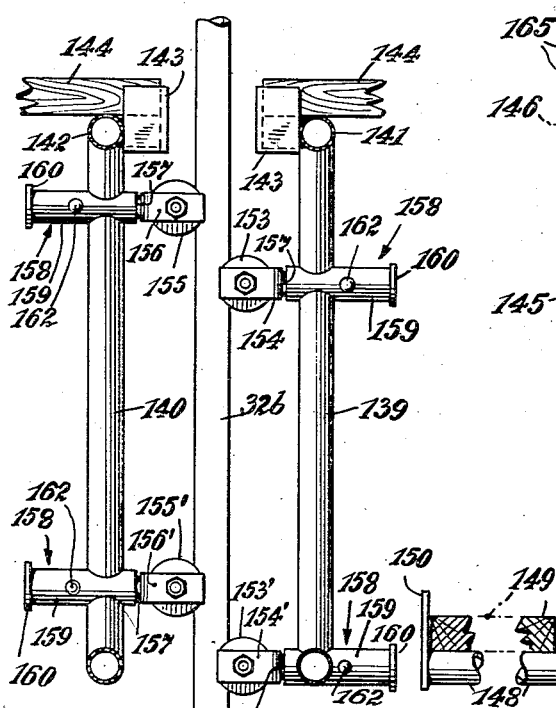
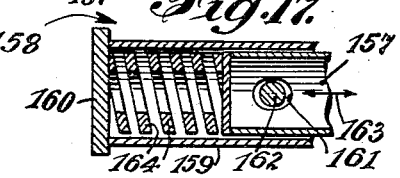
INVENTORS
Arthur C. Borgman
and Eugene V. Holahan
BY C. P. Goepel
their ATTORNEY

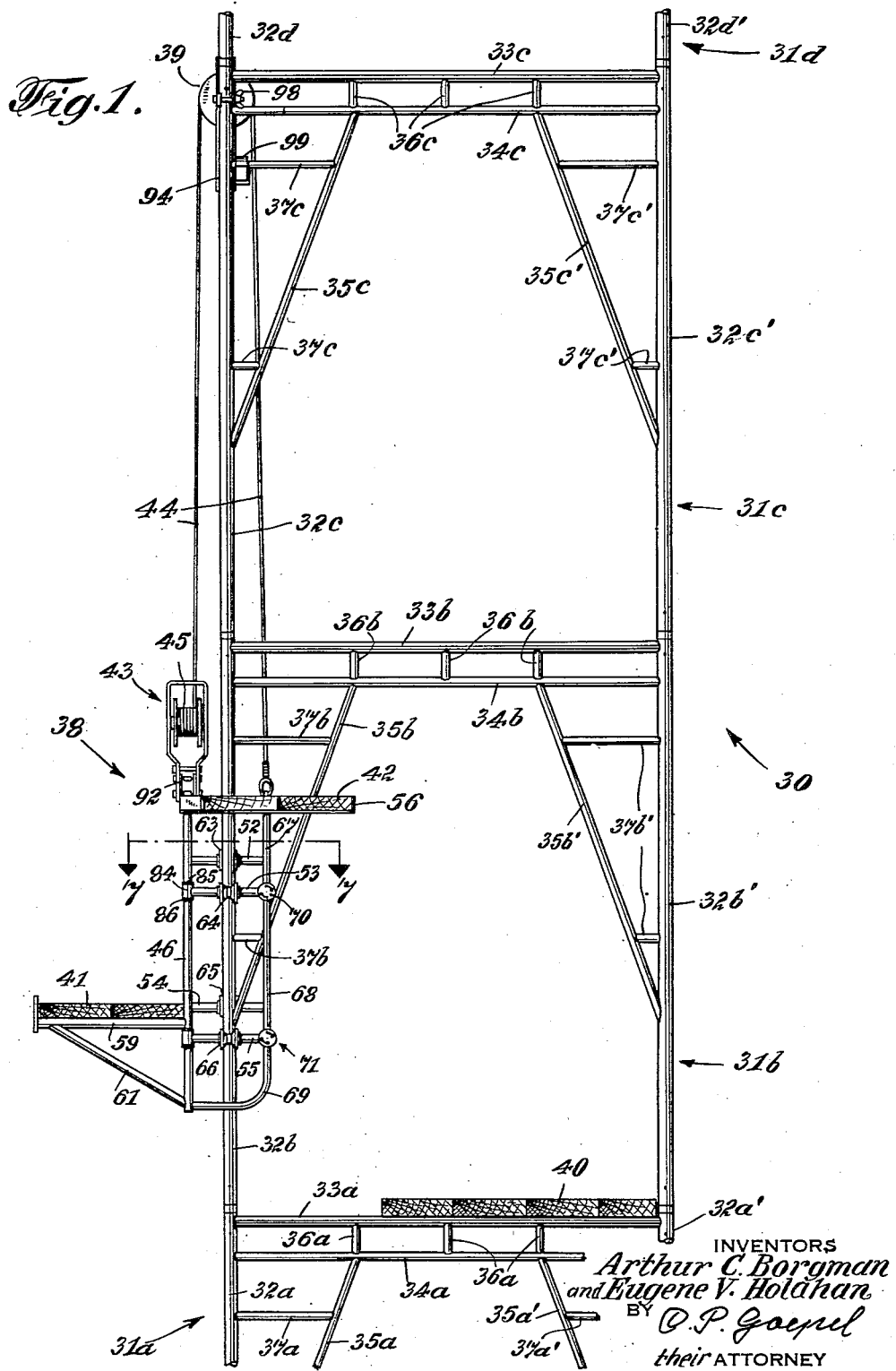

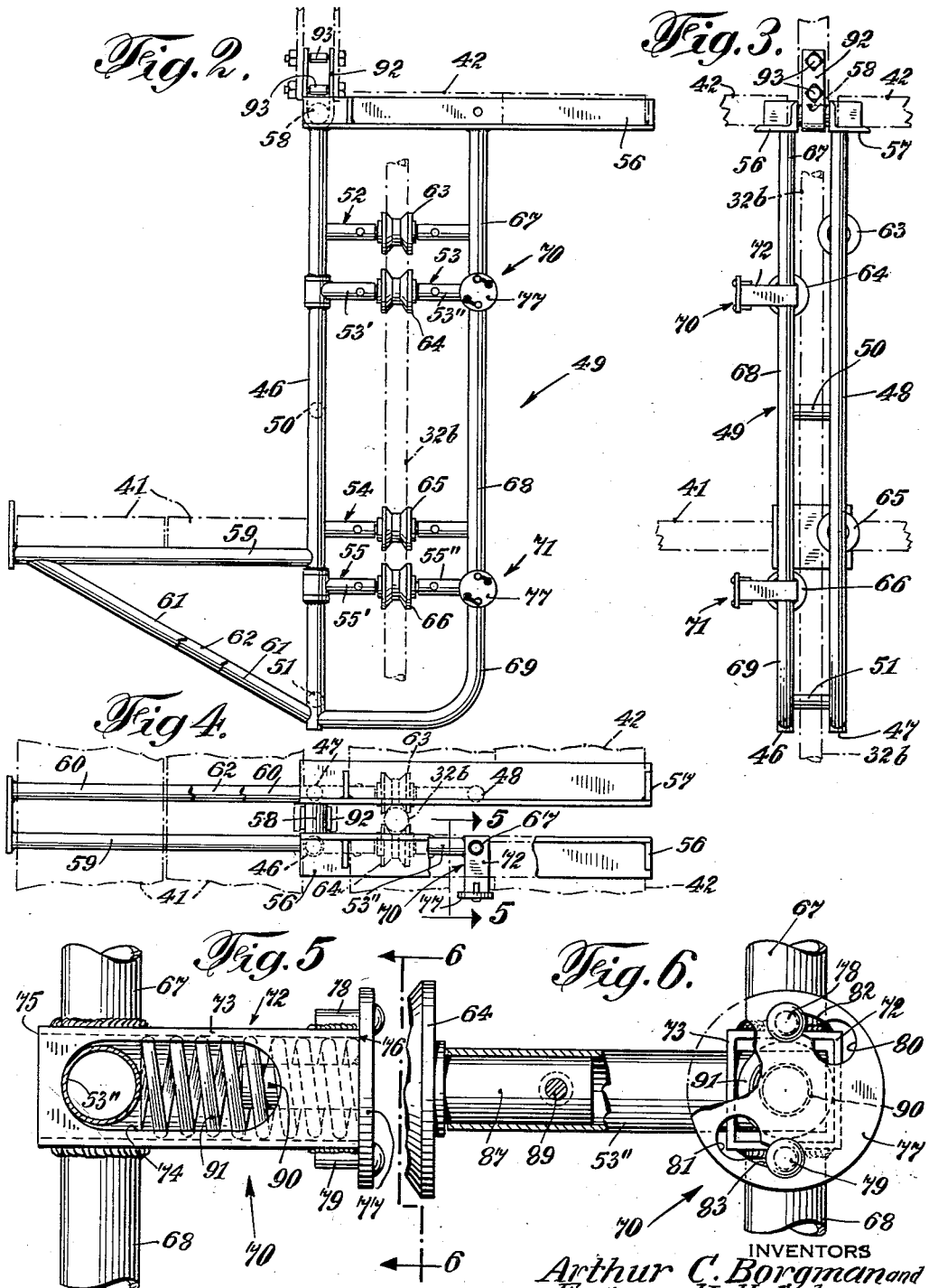

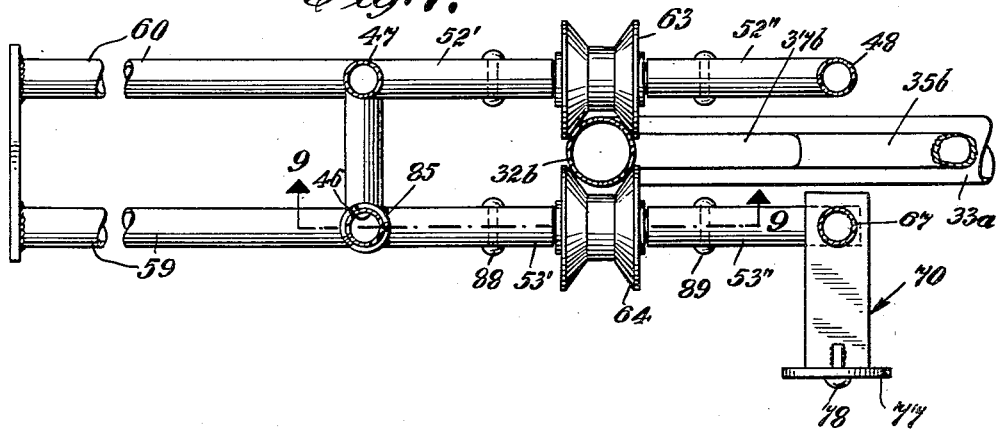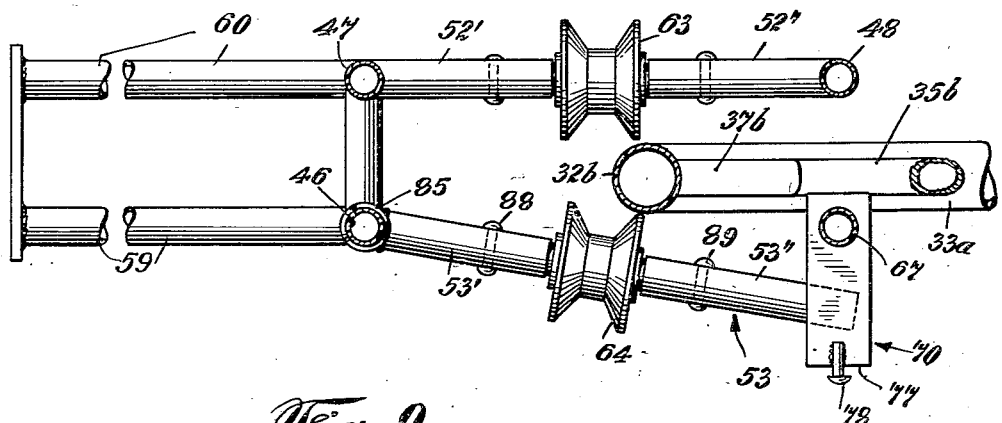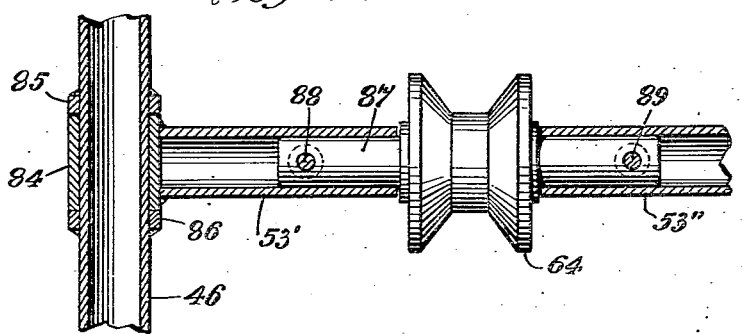

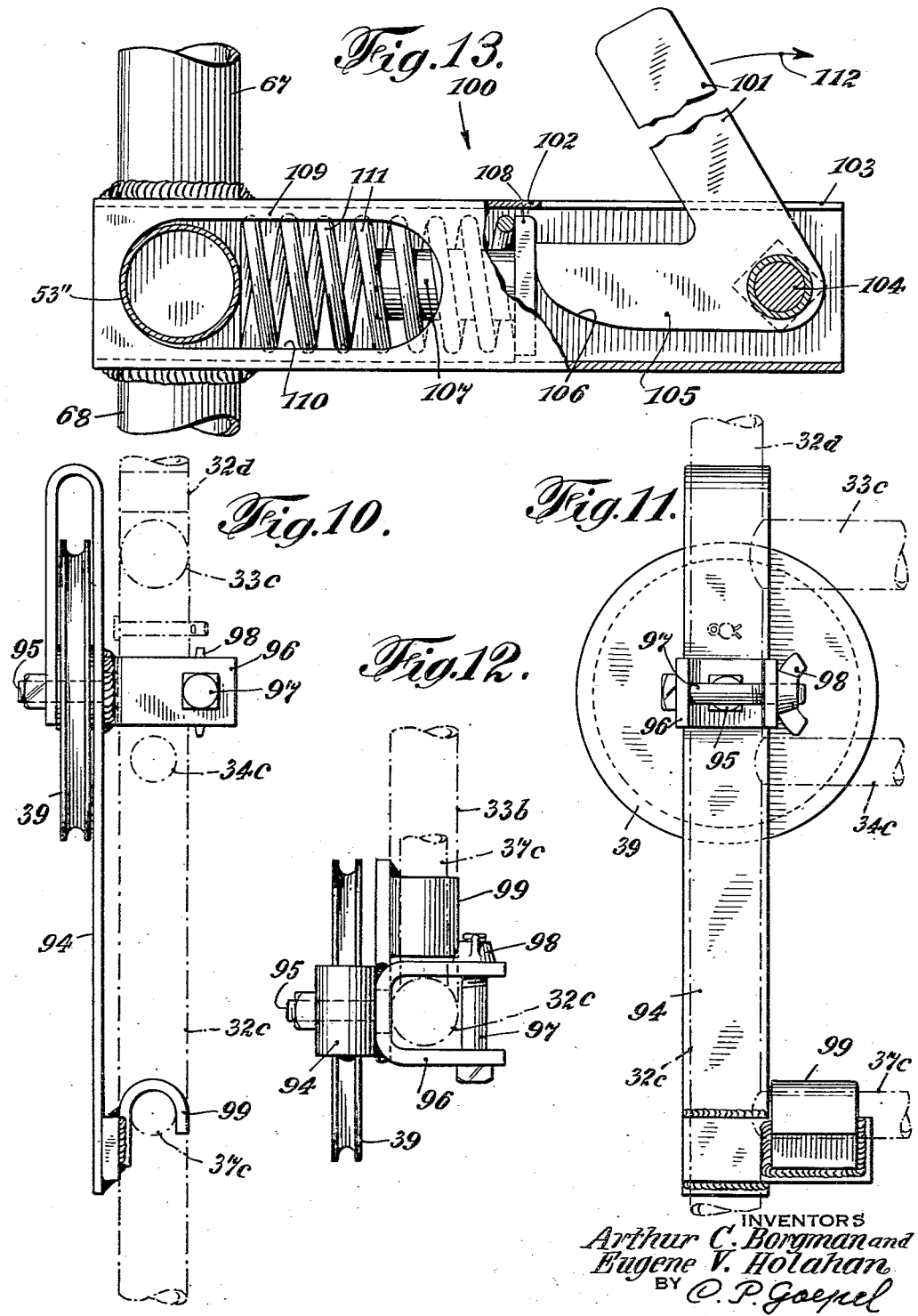

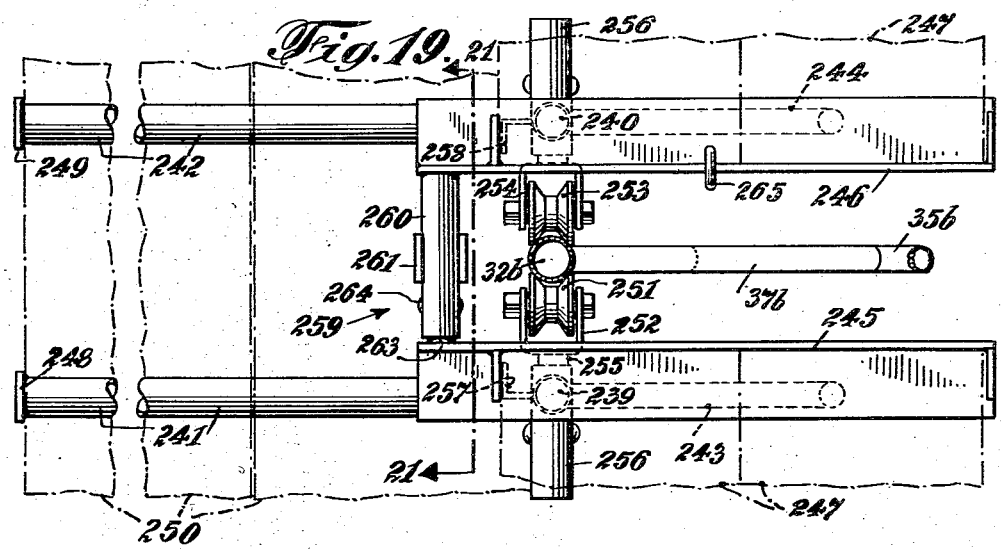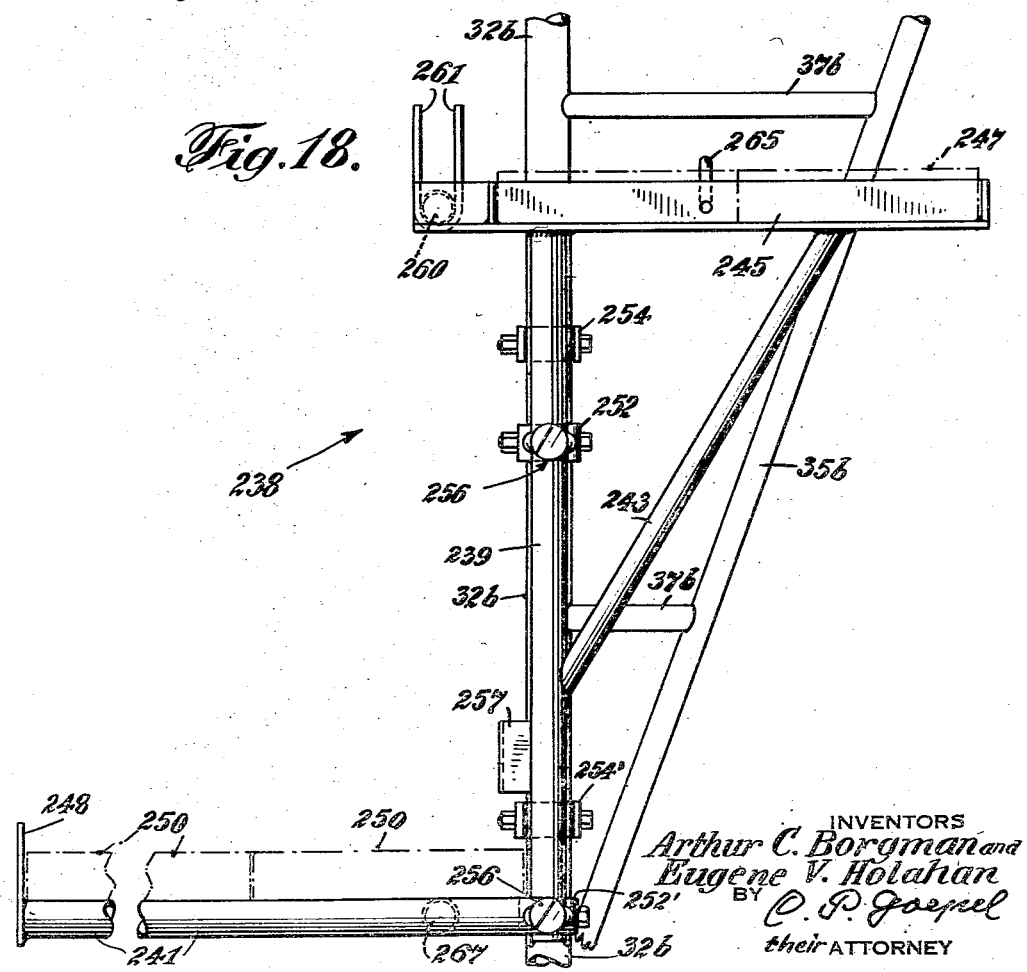

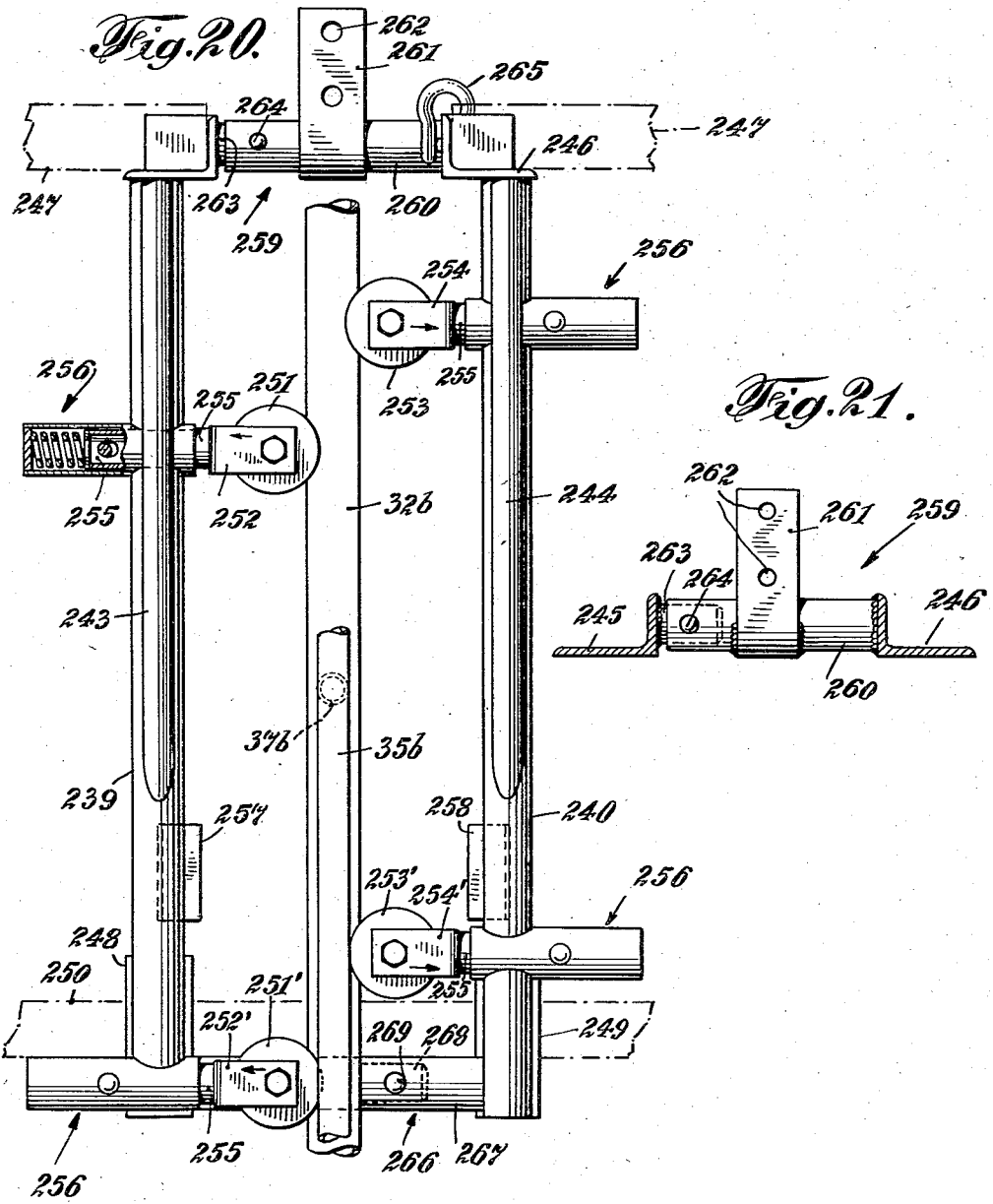

United States Patent Office 2,803,503
Patented Aug. 20, 1957

2,803,503

PLATFORM BRACKETS FOR SECTIONAL SCAFFOLDS

Arthur C. Borgman and Eugene V. Holahan, Franklin Square, N. Y., assignors to The Patent Scaffolding Co., Inc., Long Island City, N. Y., a corporation of New York Application August 2, 1956, Serial No. 601,788

12 Claims. (Cl. 304—30)

This invention relates to platform supporting brackets for sectional scaffolds of the general class disclosed in our copending application Serial No. 594,182, filed on June 27, 1956.

The principal object of our invention is to provide platform supporting and elevating brackets which may be attached to various types of known scaffolds.

Another object of the invention is to provide platform elevating brackets which may be attached to the uprights of an erected sectional scaffold.

A further object of the invention is to provide platform elevating brackets each of which may be attached to a single upright of a sectional scaffold.

A yet further object of the invention is to provide platform elevating brackets which are adapted to be moved along the uprights of a sectional scaffold with little friction and which include means enabling the brackets to pass over the impediments in their path along the scaffold uprights without reducing the safety of the structure.

A more specific object of the invention is to provide simple and eminently efficient mechanism for attachment of platform elevating brackets to the uprights of a sectional scaffold.

The invention resides essentially in the novel construction, arrangement and combination of parts herein shown and described, and more particularly pointed out in the appended claims. The important feature of the invention resides in the provision of a bracket with yieldably mounted rollers so spaced as to insure permanent contact of at least three rollers with the upright. In its preferred form, the bracket is so constructed that certain of its parts may be pivoted relative to the main body portion, whereby an assembled bracket may be attached to an erected scaffold.

In the drawing,

Fig. 1 is a side elevational view of an erected sectional scaffold with a platform elevating bracket attached to one of the scaffold uprights;

Fig. 2 is an enlarged side elevational view of the bracket;

Fig. 3 is a right-hand end view of the bracket shown in Fig. 2;

Fig. 4 is a partly sectional top view of the bracket shown in Figs. 2 and 3;

Fig. 5 is an enlarged section taken on line 5—5 in Fig. 4;

Fig. 6 is a partly sectional view of the detail shown in Fig. 5, observed from line 6—6 in Fig. 5 in the direction of arrows;

Fig. 7 is an enlarged section taken on line 7—7 in Fig. 1;

Fig. 8 is a view similar to that of Fig. 7, showing a movable roller shaft pivoted away from the stationary roller shaft for removal of the bracket from, or for attachment of the bracket to, the upright of a sectional scaffold;

Fig. 9 is an enlarged section taken on line 9—9 in Fig. 7;

Fig. 10 is an enlarged end view of the top sheave shown in Fig. 1;

Fig. 11 is a rear elevational view of the sheave;

Fig. 12 is a top view of the sheave shown in Figs. 10 and 11;

Fig. 13 is a partly sectional view of a modified spring container;

Fig. 14 is a side elevational view of a modified bracket;

Fig. 15 is a top view of the bracket shown in Fig. 14;

Fig. 16 is a section taken on line 16—16 in Fig. 14;

Fig. 17 is an enlarged section taken on line 17—17 in Fig. 15;

Fig. 18 is a side elevational view of another embodiment of our bracket;

Fig. 19 is a top view of the bracket shown in Fig. 18;

Fig. 20 is a right-hand end view of the bracket of Fig. 18; and

Fig. 21 is an enlarged section taken on line 21—21 in Fig. 19.

Referring now in detail to the illustrated embodiments, and first to that of Figs. 1 to 12, there is shown in Fig. 1 one lateral side of a scaffold 30 consisting of superposed sections 31a, 31b, 31c and 31d. Section 31c, for example, includes four uprights of which the members 32c and 32c' are visible. These two uprights are held in spaced relation by horizontal braces 33c, 34c and inclined braces 35c, 35c'. Short vertical braces 36c are shown between the horizontals 33c, 34c, and short horizontal braces 37c, 37c' are provided between the respective members 32c, 35c and 32c', 35c'. The lateral sides of the remaining sections 31a, 31b and 31d are of similar construction and their elements are similarly numbered, with the letters a, b, d following similar reference numerals.

The platform elevating bracket 38 slidably engages the upright 32b, and, according to the showing of Fig. 1, may be lifted below the top sheave 39 along the upright 32c, or it may descend along the lower upright 32a.

The bracket 38 supports an unobstructed mason's platform 41 exteriorly of the scaffold 30, and an interior interrupted material storage platform 42. It also carries a winch 43 which is usually actuated by the mason standing on the lower platform 41. The cable 44 is anchored in the drum 45; it then passes over the top sheave 39 and has its other end anchored in the bracket structure adjacent the upper platform 42. The winch 43 may be of any known design and forms no part of our invention.

There is a material tender's platform 40 consisting of adjacent planks placed on the horizontal brace 33a and a similar brace of the adjacent scaffold section (not shown). This platform may be supported by the next higher brace 33b or 33c, depending on the position of the material storage platform 42. It will be noted that the platform 40 extends short of the upright 32a to provide room for the elevating bracket 38.

The bracket 38 is shown in more detail in Figs. 2 to 4. It includes two vertical tubes 46, 47, an L-shaped tube 48, a similarly shaped composite member 49, two connecting horizontals 50, 51, four roller shafts 52, 53, 54, 55, two plank stops 56, 57 for the upper platform 42, a winch supporting horizontal connector 58, a pair of horizontal tubes 59, 60, and a pair of inclined braces 61, 62 between the lower ends of vertical tubes 46, 47 and the free ends of horizontals 59, 60, respectively. Four rollers 63, 64, 65, 66 are mounted on the respective shafts 52–55 in a manner shown in more detail in Fig. 9.

The composite member 49 consists of an upper tubular section 67 whose upper end is welded to the plank stop 56, a median section 68 and a lower curved section 69 whose horizontal end is welded to the lower end of the vertical tube 46. Two similar spring containers 70, 71 are welded between the respective tube sections 67, 68 and 68, 69 as is best shown in Figs. 2 and 3. The spring container 70, shown in detail in Figs. 5 and 6, has a rectangular tubular housing 72 which has an elongated opening 74 in its front vertical wall 73. The opening 74 is of the shape shown in Fig. 5. The container 70 is closed at its end 75 and open at its opposing end 76, the latter being normally closed by a round plate 77 which is retained on the heads of rivets 78, 79 holding the plate in bayonet lock fashion. To this end, plate 77 has two rounded bores 80, 81 of a diameter slightly exceeding the diameter of the rivet heads in communication with reduced slots 82, 83 which receive the shanks of the respective rivets 78, 79.

Each of shafts 52—55 consists of two tubular sections. For example, shaft 53 has a left-hand tubular section 53' (see Fig. 9) integral with a sleeve 84 which is rotatable on the vertical tube 46 between the collars 85, 86, and a right-hand tubular section 53" whose free end extends into the opening 74 in the vertical wall 73 of the spring container 70 (see Figs. 5 and 6). The roller 64 is rotatable on a short shaft 87 which is received in sections 53', 53" and retained therein by the pins 88, 89, respectively. The roller 66 is mounted in similar fashion on the shaft 55 whose construction is identical with that of shaft 53. As is shown in Fig. 2, the left hand section 55' of shaft 55 is pivotally attached to the vertical tube 46, and its right hand section 55" extends into the opening in the spring container 71. The free ends of sections 52', 52" of the roller shaft 52 are rigidly connected with members 47, 48, respectively, and the shaft 54 is similarly mounted between the members 47, 48.

The round plate 77 carries a stud 90 which extends into the container axially of the coil spring 91.

The winch 43 is attached to a U-shaped bracket 92 by means of bolts and nuts 93.

The top sheave 39 is mounted on a shaft 95 supported by a member 94 (see Figs. 10–12). The member 94 has an upper yoke 96 which embraces the upright 32c (see Fig. 1) and is retained thereon by a bolt 97 and a wing nut 98. The lower end of member 94 carries a hook 99 which engages the upper horizontal brace 37c.

For the sake of clarity, the parts of the sectional scaffold 30 are shaded only in Fig. 1. In the remaining figures, the uprights and braces of the scaffold sections are shown unshaded or in dot-dash lines.

Fig. 8 illustrates the assembled bracket 38 in the process of being attached to the upright 32b. The round plates 77 and the springs 91 are removed from the spring containers 70, 71, whereupon the shafts 53 and 55 are free to pivot around the vertical tube 46. The free ends of shaft sections 53", 55" move in the elongated openings 74 toward the open ends 76 of the spring containers 70, 71. The length of the openings 74 is suitably selected to permit insertion of the upright 32b between the stationary rollers 63, 65 and the movable rollers 64, 66. The springs 91 are then reinserted into the containers 70, 71 and bear against the free ends of shaft sections 53", 55" when the round plates 77 are attached to the rivets 78, 79. When the rollers, while traveling along the upright 32b in downward direction, encounter an obstruction such as the end of the brace 33a, the shaft 55 pivots slightly to permit the passage of the brace 33a between the rollers 65, 66, whereupon the spring 91 returns the shaft 55 into its normal position (see Fig. 7). When the plate 77 is attached to the spring container 71, the extent of pivoting movement of the shaft 55 is controlled by the stud 90 whose length is selected with a view to prevent excessive compression of the spring 91 by the free end of the shaft section 55". The shafts 52—55 are at such levels that at least three rollers are permanently in contact with the periphery of the upright.

Fig. 13 illustrates a modified spring container 100 wherein the removable plate 77 is replaced by a lever 101 extending through the slot 103 in the upper wall 102 and is pivotably mounted on a pin 104. The lever 101 has a short extension 105 with a cam surface 106 which engages the end plate 108 of a stud 107. The vertical front wall 109 of the container 100 has an elongated aperture 110 into which extends the section 53" of the roller shaft 53 to be normally urged toward left by the spring 111.

When it is desired to attach the bracket 38 to the upright of a sectional scaffold in a manner similar to that shown in Fig. 8, the lever 101 is pivoted in the direction of arrow 112 whereby the portion 105 projects from the container 100 through the upper slot 103 and the roller shaft section 53" is free to move toward the right-hand end of the aperture 110, as the pin 107 with plate 108 and the spring 111 move toward the pin 104 at the right-hand end of the spring container. To move the roller 64 on the shaft 53 against the scaffold upright, the lever 101 is returned into its position illustrated in Fig. 13.

In Figs. 14 to 18, there is illustrated a simplified bracket 138 slidably mounted on the upright 32b. The bracket consists of two vertical tubes 139, 140, a pair of upper horizontals 141, 142, each carrying a pair of plank stops 143 for the planks of the upper material storage platform 144, a square vertical post 145 held between the tubes 139, 140 by a pair of horizontal braces 146, 147, a supporting tube 148 for the mason's platform 149 having at its free end a plank stop 150, and two inclined braces 151, 152 between the respective members 139, 141 and 140, 142. Two guide rollers 153, 153', rotatably mounted in yokes 154, 154' engage the scaffold upright 32b from one side, and two similarly spaced rollers 155, 155', mounted in yokes 156, 156', engage the upright from the opposing side. Each of the yokes has a staple 157 which is slidably received in an adjacent spring container 158, as is shown in Fig. 17. The four spring containers 158 are of identical construction. Each consists of a tubular housing 159 with one end closed, as at 160. The tubular staple 157 of each yoke is provided with two aligned elongated slots 161 receiving a pin 162 which permits limited reciprocating movement of the yoke in the axial direction of the container housing 159 (see arrow 163). The spring 164 between the end wall 160 and the projecting staple 157 urges the yoke and its guide roller against the periphery of the upright 32b.

The length of slots 161 in the members 157 is so chosen that the guide rollers may yield sufficiently when passing over an obstruction in their path (for example, the end of the horizontal brace 37b or of the inclined brace 35b) when the bracket 138 moves along the upright 32b.

It will be noted that here again at least three guide rollers are in permanent engagement with the upright. For example, and referring to Fig. 14, when the bracket 138 descends and the roller 153' hits the lower end of the brace 35b, the remaining rollers are so spaced that they remain in contact with the periphery of the upright as the springs in the containers 158 bear against the yoke staples 157 while the roller 153' moves over the end of brace 35b.

However, the remaining elements of this simplified bracket 138 are rigidly connected with one another and thus the bracket should be attached to the lowermost upright 32a before the next higher section 31b is placed above the same.

The square post 145 has openings 165 for reception of bolts (not shown) of the bracket winch.

The bracket 238 in Figs. 18 to 20 is similar to the bracket 138, with the exception that it may be assembled on an erected sectional scaffold. To this end, the left-hand and the right-hand halves of the bracket (see Fig. 20) are removably connected by means of a connector shown in Fig. 21. Referring first to Figs. 18–20, the bracket comprises two verticals 239, 240, two lower horizontals 241, 242, two inclined braces 243, 244, two upper plank stops 245, 246, upper material storage platform 247, lower plank stops 248, 249 at the free ends of plank supporting horizontals 241, 242, a mason's platform 250, two right-hand guide rollers 251, 251' mounted in yokes 252, 252', and two left-hand guide rollers 253, 253' in yokes 254, 254'. The staples 255 of the yokes are received in the spring containers 256 which are of the construction shown in detail in Fig. 20. Two plank stops 257, 258 are secured to the vertical tubes 239, 240 above their junctions with the horizontals 241, 242. A plank placed against the stops 257, 258 serves as a barrier to the person standing on the lower platform 250 to prevent an accidental fall in the scaffold.

The upper connecting member 259 (see Fig. 21) consists of a short metallic tube 260 which carries the bracket 261 having openings 262 for reception of bolts holding the winch on the platform bracket 238. Tube 260 is welded to the plank stop 246. Plank stop 245 carries a short projection 263 which enters the open end of the tube 260 and is retained therein by a pin 264. The upper plank stop 246 also carries a hook 265 which receives one end of the winch cable.

The lower connector 266 (see Fig. 20) is similarly constructed. It consists of a tube 267 integral with the member 240 and a stud 268 which is integral with the vertical 239. The stud 268 is releasably retained in the tube 267 by a pin 269 or the like.

It will be noted that in all embodiments of the novel bracket the upper material storage platform is interrupted between the two adjoining upper plank stops. The gap between the plank stops is sufficient to permit passage of the upright and of the scaffold braces. Thus, the bracket actually hugs the upright and its connecting members. The lower mason's platform need not be interrupted as it is external to the sectional scaffold.

Our platform bracket is capable of various modifications which will readily occur to persons skilled in the art, and we therefore do not desire to be limited to the exact details of construction shown and described, the scope of our invention being defined in the appended claims.

What we claim and desire to protect by Letters Patent is:

1. A platform bracket for sectional scaffolds having spaced uprights and connecting braces therebetween, which comprises, in combination: a pair of spaced vertical frame members, connectors for rigidly holding said frame members in spaced relation, two horizontal upper platform supports each attached to the upper end of one of said frame members and extending in substantially parallel relationship from the latter, a horizontal lower platform support extending from the lower ends of said frame members in a direction opposed to that of said upper platform supports, a first pair of vertically aligned guide rollers supported by the first of said frame members for engaging one side of a scaffold upright located between said upper platform supports, a second pair of vertically aligned guide rollers supported by the second of said frame members for engaging the opposing side of said upright, with said guide rollers spaced at different levels, a horizontal shaft for each of said rollers, and means associated at least with said first pair of rollers for yieldably urging same in horizontal direction toward said upright, said means including a spring container and a resilient element in same.

2. The bracket according to claim 1, wherein said connectors each include a tube attached to said first frame member, a pin attached to said second frame member and extending into said tube, and a locking device for releasably retaining said pin in said tube.

3. A platform bracket for sectional scaffolds having spaced uprights and connecting braces therebetween, which comprises, in combination: a pair of spaced vertical frame members, two horizontal and substantially parallel upper platform supports each attached to the upper end of one of said frame members with the first extremities of said supports closer to the respective frame members than the second extremities thereof, a first connector between said upper platform supports in the proximity of said first extremities thereof, a second connector for the lower ends of said frame members, a horizontal lower platform support attached to said second connector and extending with its free end from said frame members in a direction opposed to the second extremities of said upper platform supports, a first pair of horizontal tubular spring containers attached to the first of said frame members at different levels, a second pair of horizontal tubular spring containers attached to the second of said frame members at different levels, each of said containers having a closed end and an open end facing the opposing one of said frame members, a resilient element therein, a stud slidably projecting through said open end into said container, a retaining member for holding one end of said stud in said container and for allowing reciprocal movement of said stud in axial direction of said container, a yoke at the other end of said stud, a horizontal shaft in said yoke and a roller on said shaft, the rollers of the first pair of said containers being in vertical alignment and the rollers of the second pair of said containers being in vertical alignment, with said vertically aligned rollers yieldably bearing against opposing sides of a scaffold upright between said frame members.

4. The bracket according to claim 3, further including a winch attached to said first connector.

5. The bracket according to claim 3, further including a vertical reinforcing member between said first and said second connector and a winch attached to the upper end of said reinforcing member.

6. The bracket according to claim 3, wherein each of said connectors consists of a tube attached to said first frame member, a pin attached to said second frame member and extending into said tube, and a locking device for releasably retaining said pin in said tube.

7. A platform bracket for sectional scaffolds having spaced uprights and connecting braces therebetween, which comprises, in combination: a pair of spaced vertical frame members, connecting members between said frame members, two horizontal upper platform supports each attached to the upper end of one of said frame members and extending in substantial parallelism from the latter, a horizontal lower platform support attached to said frame members in the proximity of the lower ends thereof and extending in a direction opposed to that of said upper platform supports, a first support member attached to the first of said upper platform supports and substantially parallel with the first of said frame members, a second support member attached to the second of said upper platform supports and substantially parallel with the second of said frame members, a first pair of vertically spaced horizontal shafts between said first frame member and said first support member, a roller on each of said shafts, a second pair of vertically spaced horizontal shafts, each of said last mentioned shafts having a first end pivotally connected to said second frame member and a second end extending toward said second support member, a roller on each of said last mentioned shafts, a pair of horizontal tubular spring containers attached to said second support member each at the level of one of the second pair of said shafts, each of said containers having an elongated horizontal opening for the entry of the second end of one of said second pair of shafts, a resilient element in each of said containers for urging said second ends in said openings toward said first support member, and means for retaining said resilient elements in said containers.

8. The bracket according to claim 7, wherein each of said resilient elements is a coil spring and said means for retaining said springs in said containers each consist of a pair of headed bolts and a plate removably retained by said bolts.

9. The bracket according to claim 8, wherein said plate is retained on said bolts in bayonet lock fashion.

10. The bracket according to claim 8, wherein each of said plates has a pin axially extending into said coil spring toward and short of the second end of one of said second shafts for limiting the horizontal movement of said second ends in said openings.

11. The bracket according to claim 7, wherein said resilient element is a coil spring and said container has an elongated slot in the longitudinal direction thereof, said means for retaining said spring in said container consisting of a lever extending from said container through said slot, means for pivotally supporting one end of said lever in said container, said lever having a projecting portion at an angle thereto normally received in said container and projectable therefrom when said lever is pivoted, and a pin axially received in said spring and having a flange engaged by said projecting portion of said lever.

12. The bracket according to claim 7, further including a winch attached to one of said connecting members in the proximity of the upper ends of said frame members.

References Cited in the file of this patent

UNITED STATES PATENTS

| | | |
|---|---|---|
| 109,232 | McKenzie | Nov. 15, 1870 |
| 727,407 | Murphy | May 5, 1903 |
| 1,111,814 | Waterson | Sept. 29, 1914 |
| 2,342,427 | Riblet | Feb. 22, 1944 |
| 2,569,653 | Boedecker | Oct. 2, 1951 |

FOREIGN PATENTS

| | | |
|---|---|---|
| 815,098 | Germany | Oct. 31, 1951 |